March 24, 1959   L. R. NETHERTON ET AL   2,878,611
FISH LURE
Filed Oct. 25, 1957
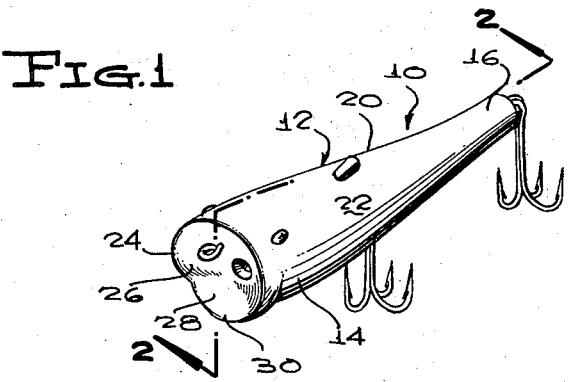
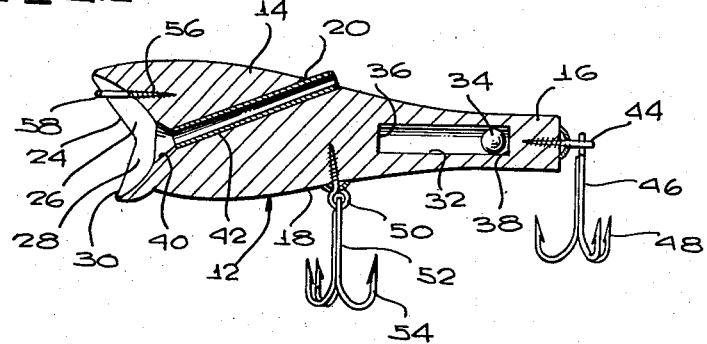
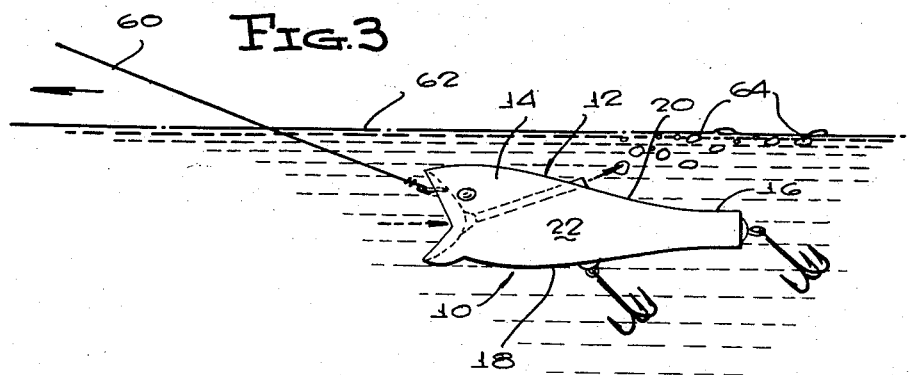
INVENTORS
LYMAN R. NETHERTON
& JESSE G. BAKER
BY
McMorrow, Berman + Davidson
ATTORNEYS

2,878,611

FISH LURE

Lyman R. Netherton and Jesse G. Baker,
River Rouge, Mich.

Application October 25, 1957, Serial No. 692,339

2 Claims. (Cl. 43—42.06)

This invention relates to lures and, more specifically, to a new and improved fishing lure.

One of the primary objects of this invention is to provide a fishing lure which is so constructed as to have the appearance and action of live bait.

Another object of this invention is to provide a fishing lure for casting or trolling, of the type generally referred to above, together with means for producing a noise or vibrations in a body of water.

A further object of this invention is to provide a fishing lure of the type referred to supra, wherein the noise producing means also serves as a ballast for the lure.

Still another object of this invention is to provide, in a fish lure, means for creating a stream of air bubbles as the lure is submerged and forwardly towed.

This invention contemplates, as a still further object thereof, the provision of a fish lure which is non-complex in construction and assembly, inexpensive to manufacture, and durable in use.

Other and further objects and advantages of the present invention will become more evident from a consideration of the following specification when read in conjunction with the annexed drawing, in which:

Figure 1 is a perspective view of a fish lure constructed in accordance with this invention;

Figure 2 is a longitudinal detail cross-sectional view of the fish lure taken substantially on the vertical plane of line 2—2 of Figure 1, looking in the direction of the arrows; and, Figure 3 is a side elevational view of the fish lure illustrated in Figure 1, Figure 3 showing the lure as being submerged below the surface of the water and emitting a trail of air bubbles or pockets.

Reference numeral 10 designates, in general, a fish lure constructed in accordance with the teachings of this invention. As is illustrated in the several figures, the fishing lure 10 may be constructed of wood, plastics, metal or of any other desirable materials.

The lure 10 is seen to comprise a substantially solid main body 12 having a forward end portion 14 and a rear end portion 16. The forward end portion 14 is substantially ovate in transverse cross-sectional configuration, and the rear end portion is substantially cylindrical in transverse cross-sectional configuration. As is clearly seen in the drawings, the bottom or underside of the inner end of the forward end portion 14 merges with the inner end of the rear end portion 16 along a gently curved line or surface 18, whereas the top and side surfaces 20, 22, respectively, taper towards the inner end of the rear end portion 16 at a much sharper angle (see Figures 2 and 3).

The upper part of the outer end of the forward end portion 16 is undercut to form a lip 24 provided with a concave portion 26 which merges at its inner end with a concave surface 28 formed in an undercut lip 30 extending inwardly from the lower portion of the outer end of the end portion 16. As is seen in Figure 2, the outer end of the lip 24 overhangs and projects beyond the outer end of the lip 30.

Disposed within the rear end portion 16 and extending partially into the forward end portion 14 is an elongated substantially hollow cylindrical cavity 32 in which is loosely disposed a solid spherical member 34. The cavity 32 is provided with a pair of opposed closed ends 36, 38 to serve a function to be described below.

At, substantially, the junction of the concave portion 26 with the concave portion 28, the outer end of the front end portion 14 is formed with a frusto-conical opening 40 the restricted end of which is in open communication with the inner lower end of an elongated substantially hollow cylindrical open-ended tubular conduit 42. The conduit 42 is inclined rearwardly from its inner end towards its outer end, and the outer end thereof opens through and above the top 20 of the front portion 14.

An eye screw 44 penetrates the outer end of the rear end portion 16 and projects longitudinally therefrom to serve as means for swingably connecting one end of the shank 46 of the fishhook 48 thereto. In a similar manner, a second eye screw 50 penetrates the underside of the main body 12 substantially midway between the ends thereof and depends therefrom to serve as means for swingably connecting one end of the shank 52 of a second fishhook 54 thereto. A third eye screw 56 penetrates the outer end of the front end portion 14 with the eye 58 thereof disposed substantially within the concavity 26. The eye 58 is adapted to be connected to one end of a fishing line 60.

In using this lure let it be assumed that it is being drawn through a body of water 62 at a substantially uniform rate. Under this condition, the lure 10 would normally follow a linear path. However, lure 10 is subject to reaction due to currents, cross-currents, and the normal swinging movements of the fishing rod (not shown) so that the lure undulates or moves in a sinusoidal path simulating the path of movement of a live fish or bait. During the course of the forward travel of the lure 10 water enters the opening 40 and passes through the tubular member 42 for discharge through the open upper end thereof. Now, the agitation of the lure 10 due to its divergence from its normal linear path of travel sets up a turbulence in the water and the jet action of the water discharged from the tubular member 42 immediately adjacent to the jet stream to cause the air entrained therewith to separate therefrom in the form of air bubbles 64.

At the same time, and if the fisherman should so desire, the line 60 may be jerked to effect rapid acceleration and deceleration of the forward movement of the lure 10 with respect to the normal rate of linear movement thereof. The rapid acceleration and deceleration of the lure 10 causes the spherical member 24 to alternately strike the closed ends 36, 38 of the cavity 32 under the force of inertia to set up a noise or vibrations in the water 62 causing fish to be attracted to the lure 10.

Having described and illustrated one embodiment of this invention, it is to be understood that the same is offered merely by way of example, and that this invention is to be limited only be the scope of the appended claims.

What is claimed is:

1. A fishing lure comprising an elongated substantially solid main body, said main body having a front end portion integrally connected at its inner end with the inner end of a rear end portion, said main body tapering from its front end portion towards its rear end portion, said main body portion having an elongated substantially hollow tubular passageway extending therethrough, said passageway having an end thereof in open communication with the outer end of said front end portion and the other end of said passageway terminating in an opening above the top of said main body, said lure having secured thereto at least one fishhook, means on said lure for connection with one end of a fishing line, and said rear end portion having an elongated substantially hollow cylindrical cavity formed therein, said cavity having a pair of opposed closed ends, and a substantially solid spherical member disposed within said cavity for impingement against said closed ends thereof for creating a noise or for setting up vibrations in a body of water.

2. A fishing lure as defined in claim 1, and said outer end of said front end portion having an inwardly extending concave face, said front end portion having a frusto-conical opening formed therein and having the widest end thereof in open communication with said concave face, said front end portion having a tubular member disposed therein, said tubular member being upwardly and rearwardly inclined from its inner end towards its outer end, said inner end being in open communication with the restricted end of said frusto-conical opening and said outer end opening through the top of said lure, and said tubular member being disposed within said passageway.

References Cited in the file of this patent
UNITED STATES PATENTS

| | | |
|---|---|---|
| 1,272,003 | Cameron | July 9, 1918 |
| 1,848,704 | Farley | Mar. 8, 1932 |
| 2,270,487 | Withey | Jan. 20, 1942 |
| 2,467,244 | Van Hee et al. | Apr. 12, 1949 |
| 2,538,459 | Kasmeyer | Jan. 16, 1951 |